United States Patent [19]

Futamura

[11] Patent Number: 4,925,894

[45] Date of Patent: May 15, 1990

[54] ELASTOMER COMPOSITIONS FOR TIRE TREADS HAVING LOW ROLLING RESISTANCE AND GOOD WET AND DRY GRIP TRACTION

[75] Inventor: Shingo Futamura, Wadsworth, Ohio

[73] Assignee: Bridgestone/Firestone, Inc., Akron, Ohio

[21] Appl. No.: 829,684

[22] Filed: Feb. 14, 1986

Related U.S. Application Data

[63] Continuation-in-part of Ser. No. 488,966, Apr. 27, 1983.

[51] Int. Cl.$^5$ .................................................. C08K 5/01
[52] U.S. Cl. .................................... 524/484; 524/485; 524/486
[58] Field of Search ........................ 524/484, 485, 486

[56] References Cited

U.S. PATENT DOCUMENTS

| | | | |
|---|---|---|---|
| 2,334,582 | 11/1943 | Read | 196/13 |
| 2,413,259 | 12/1946 | Soday | 260/36 |
| 3,307,605 | 3/1967 | Bulgin et al. | 152/330 |
| 4,350,621 | 9/1982 | Bond et al. | 525/237 |

FOREIGN PATENT DOCUMENTS

| | | |
|---|---|---|
| 0053763 | 6/1982 | European Pat. Off. . |
| 0054911 | 6/1982 | European Pat. Off. . |
| 0064400 | 11/1982 | European Pat. Off. . |
| 0067111 | 12/1982 | European Pat. Off. . |
| 0067396 | 12/1982 | European Pat. Off. . |
| 41979 | 5/1978 | United Kingdom . |
| 2102015 | 2/1983 | United Kingdom . |
| 2103625 | 2/1983 | United Kingdom . |

OTHER PUBLICATIONS

"Cariflex", SSCP901–Introduction, note 901.01, Jan. 1982, Koninklijke/Shell-Laboratorium.
Processing Oil Applications for Styrene-Butadiene Rubbers, Sunoco Technical Bulletin—undated.

*Primary Examiner*—Joseph L. Schofer
*Assistant Examiner*—N. Sarofim
*Attorney, Agent, or Firm*—Frank J. Troy, Sr.

[57] ABSTRACT

Elastomer compositions which are particularly adapted for forming tire treads having low rolling resistance and good wet and dry grip traction comprise an elastomer having a Tg of −60° C. or higher and low viscosity aromatic oil. Especially useful aromatic oils are those having a Saybolt Universal viscosity at 100° F. of from about 50 to about 2500 SUS.

16 Claims, No Drawings

ELASTOMER COMPOSITIONS FOR TIRE TREADS HAVING LOW ROLLING RESISTANCE AND GOOD WET AND DRY GRIP TRACTION

CROSS-REFERENCE TO RELATED APPLICATIONS

This application is a continuation-in-part of U.S. Ser. No. 488,966 filed April 27, 1983.

BACKGROUND OF THE INVENTION

The invention relates to elastomer compositions which are particularly adapted for use in forming the tread portion of tires having low rolling resistance and good wet and dry grip traction. More particularly, the invention relates to elastomer compositions adapted for use as tire treads having low rolling resistance and good wet and dry grip traction which comprise an elastomer having a Tg of −60° C. or higher and a low viscosity aromatic oil.

In recent years, those active in the tire industry have devoted increasing emphasis to the development of tires having both low rolling resistance and good wet grip traction. As is well known, that portion of the tire which exerts the greatest influence on rolling resistance and traction is the tread or tread rubber portion. Low rolling resistance is desirable from a fuel consumption standpoint while good wet grip traction is desirable from a safety standpoint. However, as a general rule, these properties have been found to conflict with each other. Thus, a decrease in rolling resistance generally leads to an almost directionally proportional decrease in wet grip traction, while an increase in wet grip traction generally leads to an almost directionally proportional increase in rolling resistance.

The prior art has proposed a number of approaches to the solution of this problem. Such proposals have generally involved modifying the properties of the elastomer or elastomer composition utilized to form the tread in order to achieve the best possible balance between rolling resistance and traction.

Thus, for example, British Specification 41979/77 relates to tread compounds which are said to have good wet grip traction and improved rolling resistance which are formed from an elastomer composition containing a styrene-butadiene copolymer having a glass transition temperature, Tg, above −50° C. with the elastomer composition having a rebound resilience of 55% or more. Tread compound formulations disclosed in the examples do not contain an oil component.

European Patent Application 82 104 979.8 published 12-22-82 under Publication No. 0067 396A2 relates to an elastomer composition which possesses well-balanced low rolling resistance and high wet grip properties in which the elastomer composition comprises a styrene-butadiene rubber wherein not more than 18% of the rubber is that having an extension of molecular chain of not more than 3500° A. Tread rubber formulations disclosed in the examples contain an SBR copolymer of undefined Tg and an aromatic oil of undefined viscosity.

European Patent Application 82 630 041.0 published 12-15-82 under Publication No. 0067 111A2 relates to a tire having a non-skid portion, said non-skid portion characterized by a radially outer and a radially inner layer of elastomeric compound, said outer layer being composed of a lower rolling resistance compound than said inner layer, and said inner layer being composed of a compound which provides better traction than the compound of said outer layer. Rubber compounds disclosed in the examples contain an elastomer of undefined Tg and a processing oil of undefined type and viscosity.

European Patent Application 82 302 229.8 published 11-10-82 under Publication No. 0064 400A2 relates to a diene rubber composition, having excellent wet grip and rolling resistance properties, which comprises 25 to 90 parts by weight of at least one high molecular weight diene rubber having an intrinsic viscosity of at least 2.0 and a Tg of not lower than −50° C., and 75 to 10 parts by weight of at least one low molecular weight diene rubber having an intrinsic viscosity of 0.01 to 2.0, said composition having an average intrinsic viscosity of at least 1.8. Tread rubber formulations disclosed in the examples contain an aromatic oil of undefined viscosity.

European Patent Application 81 109 924.1 published 6-16-82 under Publication No. 0053 763A1 relates to a tread rubber composition which provides a rubber having improved wet grip traction and excellent rolling resistance, said composition containing as a rubber component a synthetic isoprene rubber having a 3,4-bonding content of at least 15% by mole and an intrinsic viscosity of at least 2.0 in toluene at 30° C. The Tg of the isoprene rubber is not defined. The tread rubber compositions disclosed in the examples contain an aromatic oil of undefined viscosity.

European Patent Application 81 110 517.0 published 6-30-82 under Publication No. 0054 911A1 relates to a random styrene-butadiene copolymer rubber having excellent resilience, wet grip traction, tensile strength, abrasion resistance and heat build up which comprises 10 to 40% by weight of styrene units with the balance being butadiene units having a 1,2-vinyl structure of 60% or less and an Mw/Mn ratio of 1.2 to 3.5. The Tg of the copolymers is not defined. Styrene-butadiene copolymer rubber formulations shown in the examples contain an aromatic process oil of undefined viscosity.

British Patent 2,102,015 relates to a tire tread having a good balance of properties including rolling resistance and wet grip properties made from a composition of which at least 30% of the rubber component is a solution polymerized styrene-butadiene rubber, preferably a star-shaped polymer in which X in the equation $$X = \text{styrene content (\%)} + \frac{\frac{100 - \text{styrene content (\%)}}{100}}{2} \text{vinyl content (\%)}$$

is between 26 and 39. The copolymer as disclosed preferably has a Tg of below −50° C. Tread rubber formulations disclosed in the examples contain a higher aromatic oil of undefined viscosity. Moreover, these tread rubber formulations generally contain a blend of the above copolymer and other elastomers.

British Patent 2,103,625 relates to a tire having low rolling resistance and high wet skid resistance comprising in its tread a rubber composition consisting essentially of 100 parts of mixed elastomer and 40–80 parts of carbon black, the mixed elastomer consisting of 10–60 parts of solution-polymerized styrene-butadiene copolymer containing 5–30% styrene and not more than 45% trans-1,4 butadiene rubber units; 10–50 parts of emulsion polymerized styrene-butadiene copolymer rubber containing 30–50% styrene and 0–80 parts of at least one rubber having a Tg of not higher than −50° C., selected from natural rubber, synthetic polyisoprene rubber, polybutadiene rubber and emulsion polymerized styrene-butadiene copolymer rubber containing 18-28% styrene. Tread rubber formulations disclosed in the examples contain an aromatic oil of undefined viscosity.

U.S. Pat. No. 3,307,605 relates to tires having improved road gripping power (i.e., traction) and lack of squeal in which the tread material of the tire consists of a vulcanized composition containing a butadiene-styrene copolymer having a bound styrene content in the range of 35-50%. The patent teaches that the improved road gripping power is believed to be related to the fact that copolymers of higher styrene content have higher second order transition temperature, i.e., Tg, than conventional copolymers which have a styrene content of about 23%. The patent does not appear to disclose the Tg of the copolymer but only the Tg of the vulcanized tread rubber composition. The patent discloses at column 6, lines 61-70 that the tread rubber compositions may contain from 0 to 50 parts of a hydrocarbon extending oil. Tread rubber compositions shown in the examples contain aromatic oils of undefined viscosity. However, the tread rubber composition of Example 1 discloses the use of Sundex 53 oil which is a high viscosity aromatic oil having a viscosity at 100° F. of 3500 SUS. The patent also discloses the use of an extending oil designated Sinclair 1559A. This is a naphthenic oil having an aromatic content of 39% and a viscosity at 100° F. of 320-330 SUS.

U.S. Pat. No. 4,350,621 relates to tires having good grip on road surfaces and low frictional resistance to rolling on the road surface having treads formed from vulcanizates of elastomer compositions comprising one or more polymers having a Tg of −50° C. or lower blended with a non-crosslinking polymer or heavy oil. The non-crosslinking polymers described in the patent include polybutene, especially polyisobutylene and EPM rubber. The patent does not define heavy oil. However, the patent at column 1, lines 45-52, indicates that the non-crosslinking polymer and heavy hydrocarbon oil are highly viscous materials. Thus, at column 1, lines 47-52, the opinion is expressed that: " . . . the molecular chains of the polymer of low Tg are surrounded by a relatively viscous medium constituted by the molecules of the non-crosslinking polymer or heavy hydrocarbon oil . . . ". This clearly indicates that the heavy hydrocarbon oil referred to in the patent is a high viscosity material like polyisobutylene which is one of the preferred non-crosslinking polymers used in the reference. Moreover, the tread rubber compositions disclosed in the examples all contain polyisobutylene. The only oil shown in the examples is a mineral oil of undefined viscosity which is present in an amount of 5.0 parts.

Another approach to obtaining the tire treads having a desirable balance of low rolling resistance and good wet grip traction emphasizes the elimination of processing oil from the tread rubber formulation. This is illustrated by the publication entitled: "Cariflex" SSCP 901 - Introduction, Note 901.01, published by Koninklijke/Shell Laboratorium, Shell Research BV. Moreover, the publication entitled: "Processing Oil Applications For Styrene-Butadiene Rubber," a Sunoco Technical Bulletin, at pages 6 and 8 thereof suggests that the use of aromatic oil in rubber formulations adversely affects rebound and hysteresis properties.

The aforementioned approaches to tire treads having low rolling resistance and good wet grip traction are advantageous in certain respects. However, they suffer from significant disadvantages which materially limit their commercial utility. Thus, tread rubber compositions which contain no oil are difficult to process. Moreover, applicant has found that such compositions often exhibit lower than desirable dry grip traction properties. Approaches which require the use of polymer blends of differing molecular weight, blends of emulsion and solution polymers or special polymers such as star shaped or coupled polymers have the disadvantage of more costly and complex processes. Accordingly, there remains a need for elastomer compositions adapted to form tire treads having low rolling resistance, good wet traction and good dry traction which do not suffer from such disadvantages.

SUMMARY OF THE INVENTION

In accordance with the invention, an elastomer composition for the treads of tires having low rolling resistance, good wet and dry grip traction and other desirable properties is provided. The elastomer composition comprises an elastomer having a Tg of −60° C. or higher selected from the group consisting of a polymer of a conjugated diene and a random copolymer of a conjugated diene and a vinyl aromatic hydrocarbon, and from about 10 to 60 parts by weight per 100 parts by weight of elastomer of an aromatic oil having a viscosity at 100° F. of from about 50 to about 2500 SUS.

DETAILED DESCRIPTION OF THE INVENTION

As indicated, the elastomer compositions of the invention contain as one component an elastomer having a glass transition temperature (Tg) of −60° C. or higher, preferably higher than −55° C. The elastomer can be a polymer of conjugated diene (i.e., diene polymer) or a copolymer of a conjugated diene and a vinyl aromatic hydrocarbon.

Diene polymers having Tg's of −60° C. or higher and methods for their preparation are well known in the polymer arts. The Tg of the diene polymer is principally related to its 1,2-microstructure content. For example, a standard polybutadiene polymer conventionally employed in the tire and rubber industry will generally have a Tg of −96° C. and a 1,2-microstructure content of about 12%. In contrast, a polybutadiene polymer having a Tg of −60° C. will generally have a 1,2-microstructure content of about 50%. As will be evident from this, the Tg of a diene polymer can be raised to the desired level by increasing the 1,2-microstructure content of the diene polymer to an appropriate corresponding level.

Diene polymers having the desired 1,2-microstructure content and hence the desired Tg value can generally be prepared by polymerizing the diene monomer in a hydrocarbon solvent such as hexane in the presence of an organoalkali metal catalyst such as an alkyllithium, especially butyllithium, and an appropriate polar modifier such as an ether or amine. Especially useful polar modifiers are ethers such as diglyme, triglyme, tetraglyme, tetrahydrofuran and the like, and diamines such as N,N,N'N'-tetramethylene diamine, dipiperidino ethane and the like. The specific 1,2-microstructure content obtained is dependent on a number of factors including the specific type catalyst, the type modifier, the modifier to catalyst ratio and the polymerization temperature. Illustrative methods of preparing diene polymers having 1,2-microstructure contents ranging from 15 to 90% or more are described in numerous patents and publications including U.S. Pat. Nos. 3,451,988 and 4,264,753; and the publication "Temperature and Concentration Effects on Polar-Modifier Alkyllithium Polymerizations and Copolymerizations", Journal of Polymer Science, Part A-1, Vol. 10, pages 1319–1334 (1972); the disclosures of which are incorporated herein by reference.

One of ordinary skill in the polymerization arts can by utilizing the disclosures of the incorporated patents and publication readily determine the type catalyst, the type polar modifier, the necessary modifier-catalyst ratio and polymerization conditions necessary to obtain a diene polymer having the required 1,2-microstructure content and corresponding Tg. Preferred diene polymers for use in the elastomer compositions of the invention are polybutadiene polymers having a 1,2-microstructure content of 50% or more.

Copolymers of conjugated dienes and vinyl aromatic hydrocarbons which may be utilized in the elastomer compositions of the invention are random copolymers having vinyl aromatic hydrocarbon contents of from 5 to 50 percent by weight and 1,2-microstructure contents in the diene portion of the copolymers of less than 55 percent. Preferred copolymers are those having vinyl aromatic hydrocarbon contents of from 25 to 40 percent by weight and 1,2-microstructure contents in the diene portion of the copolymer of less than 40 percent.

Such copolymers may in general be prepared by polymerizing the conjugated diene and vinyl aromatic hydrocarbon monomers in a hydrocarbon solvent in the presence of an alkyllithium catalyst and a polar modifier using appropriate levels of catalyst and modifier and polymerization temperatures of from 0° C. to 200° C. For example, a random copolymer of butadiene and styrene having a styrene content of from 25 to 40 percent by weight and a 1,2-microstructure content in the butadiene portion of from 15 to 25 percent can be prepared by polymerizing the styrene and butadiene monomers in hexane and/or cyclohexane in the presence of an n-butyllithium catalyst and a tetrahydrofuran (THF) modifier, utilizing from about 0.5 to about 0.7 mM (millimoles) of catalyst per 100 grams of monomers and from about 2 to about 10 mM of THF per 100 grams of monomer and a polymerization temperature of from about 60° to 85° C.

Alternatively, a random copolymer of butadiene and styrene can be prepared without the use of a modifier if desired. Illustrative procedures for preparing such copolymers without using modifiers are described in the article entitled "Solution SBR" by T. C. Bouton and S. Futamura published in Rubber Age, March 1, 1974, pages 33–39. However, care must be exercised in using such procedures to assure that the copolymer does not contain excessive amounts of block polystyrene. Thus, the block polystyrene present in the copolymer should be less than 10 percent, preferably less than 5 percent. The amount of block polystyrene in the copolymer can be determined by chemical analysis in accordance with the procedure set forth in ASTM D3314-74 pages 728–730.

Conjugated dienes which may be utilized in preparing the polymers and copolymers include 1,3-butadiene, 2-methyl-1,3-butadiene (isoprene), 2,3-dimethyl-1,3-butadiene, 1,3-pentadiene, 1,3-hexadiene and the like as well as mixtures thereof. The preferred diene is 1,3-butadiene.

Vinyl aromatic hydrocarbons which may be utilized in preparing the copolymers include styrene, vinyl toluene, alpha-methyl styrene, vinyl naphthalene, vinyl pyridine and the like. The preferred vinyl aromatic hydrocarbon is styrene.

Hydrocarbon solvents which may be employed in the preparation of the polymers and copolymers include aromatic and aliphatic hydrocarbons in which the monomers, catalyst and modifier are soluble. Suitable hydrocarbon solvents include hexane, heptane, pentane, octane, cyclohexane, cycloheptane, cyclopentane, methyl cyclohexane, benezene and toluene. The preferred hydrocarbon solvents are hexane and cyclohexane.

Catalysts which may be utilized in the preparation of the polymers and copolymers may be selected from any of the organoalkali metal catalysts known in the art to be useful for the polymerization of diene polymers and copolymers. The preferred catalysts are organolithium catalysts, especially the alkyllithium catalysts. Suitable organolithium catalysts which may be utilized include ethyllithium, tetramethylene dilithium, hexyllithium, cyclohexyl lithium, phenyllithium, tolyllithium and the like. The preferred catalyst is n-butyllithium.

Polar modifiers which may be utilized to control the 1,2-microstructure content of the polymers or copolymers and to effect randomization of the copolymers include tetrahydrofuran (THF), tetrahydropyran, 1,4-dioxane, monoglycol methyl ether (monoglyme), diglycol methyl ether (diglyme), triglycol methyl ether (triglyme) and the like. Suitable amine compounds include triethyl amine, tripropyl amine, tributyl amine, N,N,N',N'-tetramethyl ethylene diamine (TMEDA), dipiperidino ethane, pyridine and the like.

As indicated, the basic elastomer component of the elastomer compositions of the invention is an elastomer having a Tg of −60° C. or higher, preferably higher than −55° C. as defined above. However, it should be noted that small amounts of the elastomer having a Tg of −60° C. or higher may be replaced with an elastomer having a Tg of below −60° C. provided that the amount of the elastomer having a Tg of below −60° C. utilized does not adversely affect the rolling resistance, wet grip traction and hysteresis properties of tread rubbers formed from such compositions. Thus, up to 50 percent of the elastomer having a Tg of −60° C. or higher may be replaced with an elastomer having a Tg of below −60° C. Various known elastomers having Tg's of below −60° C. may be employed including natural rubber and conventional diene polymers and copolymers of conjugated dienes and vinyl aromatic hydrocarbons.

The second major component of the elastomer compositions of the invention is a low viscosity aromatic oil. The term "aromatic oil" as used herein refers to oils having total aromatic contents of more than 50 percent, preferably 60 percent or more. Low viscosity aromatic oils which may be employed are those having Saybolt Universal Viscosities at 100° F. of from about 50 to about 2500 Saybolt Universal Seconds (SUS). Preferred aromatic oils are those having viscosities at 100° F. of from about 50 to about 1500 SUS. Particularly preferred aromatic oils are those having viscosities at 100° F. of from about 50 to 600 SUS. Mixtures of low viscosity aromatic oils and higher viscosity aromatic oils may also be utilized so long as the average viscosity, SUS, falls within the aforementioned ranges. Saybolt Universal viscosity and a method for its determination are described in ASTM D2161.

Amounts of low viscosity aromatic oil employed in the elastomer compositions of the invention are based in part on processing considerations but most importantly on providing a balance between wet and dry traction properties. Thus applicant has found that elastomer compositions containing either no oil or less than 10 parts by weight of low viscosity aromatic oil per 100 parts of elastomer exhibit lower than desirable dry traction properties. Moreover, applicant has found that treads formed from elastomer compositions of the invention containing 10 parts by weight of low viscosity aromatic oil or more not only show good wet grip traction but also improved dry grip traction. Hence, elastomer compositions of the invention may contain from about 10 to about 60, preferably from 15 to 50, parts by weight of low viscosity aromatic oil per 100 parts by weight of elastomer. The most preferred elastomer compositions will contain from 20 to 40 parts by weight of low viscosity aromatic oil.

Compositions adapted for use as tread rubbers can be prepared by admixing the elastomer composition herein with conventional additives such as fillers, reinforcing agents, plasticizers, antioxidants, curing agents and the like using standard rubber mixing equipment and procedures.

The mixed tread rubber compositions can then be evaluated for rolling resistance, wet grip traction, hysteresis properties and other desired properties either by vulcanizing the composition and then subjecting the vulcanized composition to laboratory tests which are known to have a correlation to these properties, or by preparing tires having a vulcanized tread portion formed from the compositions and then testing the tires for such properties.

In this application, as shown in the examples, the tread rubber compositions were evaluated for rolling resistance, wet grip traction and other properties using the following laboratory tests:

ROLLING RESISTANCE

The rolling resistance of a tread compound is generally related to the rebound resilience of the compound expressed as a percentage of rebound. Thus, the higher the percentage of rebound exhibited by the compound, the lower the rolling resistance of the compound. The rebound test utilized in the examples is a steel ball rebound test in which the percentage of rebound is determined at 150° F. The test was conducted in accordance with the general procedure set forth at pages 320-323 of the article entitled "Hysteresis and Elastic Properties of Rubberlike Materials Under Dynamic Shear Stresses" by J. H. Dillon, I. B. Prettyman and G. L. Hall in the Journal of Applied Physic, Vol. 15, pages 309-323 (1944).

WET GRIP TRACTION

The wet grip traction of a tread rubber compound is generally related to the coefficient of friction between the tread rubber compound and road surface. In the laboratory procedure utilized in the examples, the wet grip traction of the various tread rubber compounds was determined using the Stanley London wet skid resistance test which employs the British Portable Skid Tester. The skid resistance tester is a pendulum device having as a bob a spring loaded rubber slider. The slider is composed of a thick block of the compound to be tested bonded to a backing plate, which is fixed to the bottom of the pendulum arm. When the pendulum is released, by proper adjustments the rubber slider may contact the test surface over a definite length during its stroke. The energy loss of the pendulum arm, which balances the friction work done by the slider is a function of the skid resistance of the test surface (e.g., wet concrete, wet asphalt, wet etched glass, etc.) and the rubber compound used. In the examples, the test surface utilized was etched glass.

DRY GRIP TRACTION

The dry grip traction of the tread rubber compound can be determined using substantially the same laboratory procedure as set forth in the wet grip traction test except that the test surface is dry. However, the most reliable data is obtained by actual testing of tires on dry road surfaces.

YOUNG'S MODULUS INDEX

Young's Modulus Index (YMI) is also related to the wet grip traction of the tire. A higher YMI value generally means better wet grip traction. The relationship between YMI and wet grip traction is described in the paper entitled "Relation of Polymer Structure To The Application of Butadiene Elastomer" by G. Alliger and F. C. Weissert presented at the International Rubber Conference, Paris, France May 25, 1966 and published in Revue General du Caoutchouc, Vol. 43, (10), 1321-28 (1966). YMI is also related to the low temperature flexibility properties of the rubber compound. The YMI values reported in the examples are based on temperature in degrees C when the modulus of the test material reached $10^4$ psi. Tests were conducted in accordance with the procedure set forth in ASTM D797.

GLASS TRANSITION TEMPERATURE (TG)

The glass transition temperature, Tg, of the polymer is defined as the onset temperature of the transition measured by differential scanning colorimetry (DSC) at the rate of 20° C. per minute. However, when the transition region of the polymer is broad (offset-onset temperature is larger than 10° C.), the Tg should be interpreted as 5° C. below the inflection point of the transition. The Tg is determined using a DuPont 1090 Thermal Analyzer with a 910 Differential Scanning Colorimeter System following the manufacturer's recommended procedure. Onset, inflection and offset temperatures are calculated in accordance with Interactive DSC Data Analysis-Program V2D.

The following examples are submitted for the purpose of further illustrating the nature of the present invention and should not be regarded as a limitation on the scope thereof. Parts and percentages shown in the examples are by weight unless otherwise indicated.

The following Examples (A-E) illustrate the preparation of the polymer and copolymer components of the elastomer compositions of the invention.

EXAMPLE A

To a reactor equipped with heating means, stirrer and thermometer were charged 2268.0 grams of cyclohexane, 2268.0 grams of dry hexane and 120 millimoles (mM) of dry tetrahydrofuran (THF). The contents of the reactor were heated to 66° C. Then, metering of a blend consisting of 11.5% styrene, 18.7% butadiene and 69.8% hexane into the reactor was initiated. (Based upon monomers being charged, the blend contained 62% by weight of butadiene and 38% by weight of styrene). Almost immediately after metering was initiated, 14.5 mM of n-butyllithium were charged to the reactor. Metering of the blend was carried out at a rate of 4536.0 grams per hour for a period of 1.8 hours, totaling 8175.0 grams. After completion of metering, 2.0 milliliters (ml) of methanol and 100 ml of hexane were added to the reactor and the reactor was then cooled. The resultant copolymer was recovered from solution and drum dried.

The copolymer was evaluated for properties and showed a styrene content of 38.6%, a 1,2-microstructure content in the butadiene portion of 18.4% (based on butadiene=100), a dilute solution viscosity (DSV) of 2.20 deciliters per gram (dl/g) and a Tg of −44° C.

EXAMPLE B

To a reactor equipped as in Example A were charged 2288.0 grams of dry hexane, 1168.0 grams of cyclohexane and 81 mM of dry THF. The contents of the reactor were then heated to approximately 72° C. Then, metering of a blend consisting of 10.2% styrene, 21.1% butadiene and 68.7% hexane into the reactor was initiated. (Based upon monomers being charged, the blend contained 67.5% by weight of butadiene and 32.5% by weight of styrene). Almost immediately after metering was initiated, 9.85 mM of n-butyllithium were charged to the reactor. Metering of the blend was carried out at a rate of 4500 grams per hour for a period of 1.5 hours totaling 7050 grams. After completion of metering, 2.0 ml of methanol and 100 ml of hexane were added to the reactor, and the reactor was then cooled. The resultant copolymer was recovered from solution and drum dried.

The copolymer was evaluated for physical properties and showed a styrene content of 31.3%, a 1,2-microstructure content in the butadiene portion of 22.5% (based on butadiene=100), a DSV of 1.85 dl/g and a Tg of −50° C.

EXAMPLE C

Example B was substantially repeated with the exception that the blend consisted of 11.4% styrene, 18.7% butadiene, 69.9% cyclohexane, the total amount of blend charged was 7350.0 grams and 16.5 mM of n-butyllithium was employed.

The resultant copolymer showed a styrene content of 36% by weight, a 1,2-microstructure content in the butadiene portion of 23% (based on butadiene=100), a DSV of 1.29 dl/g, a number average molecular weight, $M_n$, as determined by GPC of 176,000 and a Tg of −44° C.

EXAMPLE D

To a reactor equipped as in Example A were charged 4536.0 grams of dry hexane and 54.5 grams of dry THF diluted with 100 ml of hexane. The contents of the reactor were then heated to approximately 46° C. After the heating step, 16.3 mM of n-butyllithium were charged to the reactor. Then, a blend consisting of 21.4% 1,3-butadiene, 3.8% styrene and 74.8% hexane was metered into the reactor at a rate of about 136.1 grams per minute for a period of about 66 minutes totaling 8981 grams. (Based on monomers, the blend consisted of 85% butadiene and 15% styrene). Total polymerization was 5 hours. The resultant copolymer was then recovered from solution and drum dried.

The copolymer was evaluated for properties and showed a styrene content of 16%, a 1,2-microstructure content in the butadiene portion of 54% (based on butadiene=100), a DSV of 1.64 dl/g, a molecular weight, Mn, as determined by GPC of 211,000 and a Tg of −46° C.

EXAMPLE E

To a reactor equipped as in Example A were charged 4536.0 grams of dry hexane and 100.0 grams of dry THF diluted with 100 ml of hexane. The contents of the reactor were heated to 30° C. Then, 16.3 mM of n-butyllithium were charged to the reactor. Immediately following this situation, a blend consisting of 24.5% 1,3-butadiene and 75.5% hexane was metered into the reactor at a rate of about 136.1 grams per minute for a period of about 68 minutes totaling 9253 grams. Polymerization was continued overnight and total Polymerization time was 22 hours. The resultant polybutadiene polymer was recovered from solution and drum dried.

The polybutadiene polymer was evaluated for properties and showed a 1,2-microstructure content of 65%, a DSV of 1.66 dl/g, a molecular weight, $M_n$, of 200,000 and a Tg of −45° C.

The following Examples (1–9) illustrate the utility of the elastomer compositions of the invention in forming tread rubber compounds having lower rolling resistance and good wet grip traction.

EXAMPLES 1–3

In these Examples, vulcanizable tread rubber compounds containing elastomer compositions of the invention were prepared. A control compound containing a standard SBR copolymer and a standard aromatic oil was also prepared. Compound formulations were as follows:

| Ex. No. | parts by weight | | | |
|---|---|---|---|---|
| | Control | 1 | 2 | 3 |
| Ingredients | | | | |
| Standard SBR[a] (Tg −76° C.) | 100.0 | — | — | — |
| Copolymer of Ex. A (Tg −44° C.) | — | 100.0 | 100.0 | — |
| Copolymer of Ex. B. (Tg −50° C.) | — | — | — | 100.0 |
| Aromatic oil[b] (Vis = 3500) | 37.5 | — | — | — |
| Aromatic oil[b] (Vis = 140) | — | 20.0 | 37.5 | 25.0 |
| HAF black | 62.0 | 54.0 | 62.0 | 56.0 |
| Zinc oxide | 4.1 | 3.6 | 4.1 | 3.0 |
| Stearic acid | 2.8 | 2.4 | 2.8 | 2.0 |
| Wax[c] | 4.1 | 3.6 | 4.1 | 3.0 |
| Sulfur | 2.0 | 1.8 | 2.0 | 1.6 |
| Accelerator[d] | 2.0 | 1.8 | 2.0 | 1.8 |
| | 214.5 | 187.2 | 214.5 | 192.4 |

(a) An SBR copolymer containing 18% styrene, the base polymer having an ML4 of 95 and a Tg of −76° C., available in the form of 37.5 parts by weight oil-extended copolymer from The Firestone Tire & Rubber Company under the designation Stereon 750.
(b) Viscosity at 100° F., SUS.
(c) A wax available from Terr Chemical Co., Ltd. under the designation Trutec 728PC.
(d) n-tertiary-butyl-2 benzothiazole sulfenamide The above formulations were prepared by first mixing all of the ingredients except the sulfur and accelerator in Brabender mixer and then adding the sulfur and accelerator on a mill. The compounds were then cured and tested for various properties. Test conditions and results are shown in Table I.

TABLE I

| Ex. No. | Control | 1 | 2 | 3 |
|---|---|---|---|---|
| Physical Properties | | | | |
| Steel ball rebound at 150° F. (cured: 40 min at 300° F.) | 62.5 | 67.0 | 65.5 | 70.0 |
| Hot ring tear at 212° F. (lb/in) (cured: 35 min. at 300° F. | 150 | 175 | 175 | 120 |
| Stanley London Wet Traction | 33 | 37 | 36 | 38 |
| YMI (°C.) at $10^4$ psi | −48 | −30.5 | −30.5 | −39 |

As the above data indicates, compositions of the invention show a much better balance of wet grip traction and rolling resistance properties compared to the control composition as shown by the steel ball rebound, Stanley London and YMI values.

EXAMPLES 4–7

In these Examples, the effect of the viscosity of the aromatic oil on the properties of the tread rubber compound was evaluated. In test Examples 4–7, tread rubber compounds containing a copolymer having a Tg of −44° C. (copolymer of Ex. C) and aromatic oils having relatively low but varying viscosities were prepared. For comparative purposes, control compounds designated C1 and C2 containing the same copolymer and aromatic oils of high viscosity were prepared. Compound formulations were as follows:

| Ex. No. | C1 | C2 | 4 | 5 | 6 | 7 |
|---|---|---|---|---|---|---|
| | parts by weight | | | | | |
| Ingredients | | | | | | |
| Copolymer of Ex. C | 100.0 | 100.0 | 100.0 | 100.0 | 100.0 | 100.0 |
| Aromatic oil (Vis = 3500)* | 37.5 | — | — | — | — | — |
| Aromatic oil (Vis = 7000)* | — | 37.5 | — | — | — | — |
| Aromatic oil (Vis = 140)* | — | — | 37.5 | — | — | — |
| Aromatic oil (Vis = 470)* | — | — | — | 37.5 | — | — |
| Aromatic oil (Vis = 625)* | — | — | — | — | 37.5 | — |
| Aromatic oil (Vis = 1500)* | — | — | — | — | — | 37.5 |
| HAF black | 65.0 | 65.0 | 65.0 | 65.0 | 65.0 | 65.0 |
| Zinc Oxide | 3.0 | 3.0 | 3.0 | 3.0 | 3.0 | 3.0 |
| Stearic Acid | 2.0 | 2.0 | 2.0 | 2.0 | 2.0 | 2.0 |
| Wax | 3.0 | 3.0 | 3.0 | 3.0 | 3.0 | 3.0 |
| Sulfur | 2.0 | 2.0 | 2.0 | 2.0 | 2.0 | 2.0 |
| Accelerator | 2.0 | 2.0 | 2.0 | 2.0 | 2.0 | 2.0 |
| | 214.5 | 214.5 | 214.5 | 214.5 | 214.5 | 214.5 |

*Viscosity at 100° F., SUS

The above formulations were mixed and tested for various properties as in Examples 1–3. Test conditions and results are shown in Table II.

TABLE II

| Ex. No. | C1 | C2 | 4 | 5 | 6 | 7 |
|---|---|---|---|---|---|---|
| Stress-Strain (Cure: 30 min. at 300° F.) 100% modulus (psi) | 315 | 365 | 335 | 320 | 340 | 315 |
| Tensile (psi) | 2000 | 2300 | 1900 | 2050 | 2700 | 2000 |
| Elongation, % | 400 | 415 | 335 | 365 | 415 | 385 |
| Hot Ring Tear (cure 35' at 300° F.) | 252 | 183 | 176 | 212 | 199 | 186 |
| Stanley London Wet Traction | 43 | 45 | 43 | 45 | 43 | 43 |
| Steel Ball Rebound at 150° F. (Cure: 40' at 300° F.) | 50 | 50 | 58 | 55 | 53 | 53 |
| YMI (°C. at $10^4$ psi) (cure: 40' at 300° F.) | −22 | −20 | −34 | −28 | −27 | −27 |

EXAMPLES 8–9

In these Examples, the evaluation of the effect of the viscosity of the aromatic oil on the properties of the tread rubber compound was continued. In test Examples 8 and 9, tread rubber compounds containing the styrene-butadiene copolymer of Ex. D (Tg=46° C.) and the polybutadiene polymer of Ex. E (Tg=−45° C.) respectively, and an aromatic oil having a viscosity at 100° F. of 140 SUS were prepared. For comparative purposes, control compounds designated C3 and C4 containing the same copolymer and polymer, and an aromatic oil having a viscosity at 100° F. of 7000 SUS were prepared. Compound formulations were as follows:

| Ex. No. | 8 | C3 | 9 | C4 |
|---|---|---|---|---|
| | parts by weight | | | |
| Ingredients | | | | |
| Copolymer of Ex. D | 100.0 | 100.0 | — | — |
| Copolymer of Ex. E | — | — | 100.0 | 100.0 |
| Aromatic oil (Vis = 140) | 37.5 | — | 37.5 | — |
| Aromatic oil (Vis = 7000) | — | 37.5 | — | 37.5 |
| HAF black | 65.0 | 65.0 | 65.0 | 65.0 |
| Zinc oxide | 3.0 | 3.0 | 3.0 | 3.0 |
| Stearic acid | 2.0 | 2.0 | 2.0 | 2.0 |
| Wax | 3.0 | 3.0 | 3.0 | 3.0 |
| Sulfur | 2.0 | 2.0 | 2.0 | 2.0 |
| Accelerator | 2.0 | 2.0 | 2.0 | 2.0 |
| | 214.5 | 214.5 | 214.5 | 214.5 |

The above formulations were mixed and tested for various properties as in Examples 1–3. Test conditions and results are shown in Table III.

TABLE III

| Ex. No. | 8 | C3 | 9 | C4 |
|---|---|---|---|---|
| Stress-Strain (cure: 30' at 300° F.) (100% modulus psi) | 285 | 260 | 305 | 275 |
| Tensile (psi) | 1650 | 1700 | 1750 | 1800 |
| Elongation, % | 340 | 390 | 335 | 420 |
| Hot Ring Tear (cure: 35'at 300° F.) | 126 | 149 | 109 | 140 |
| Stanley London | 40 | 43 | 37 | 45 |

TABLE III-continued

| Ex. No. | 8 | C3 | 9 | C4 |
|---|---|---|---|---|
| Wet Traction | | | | |
| Steel Ball Rebound at 150° F. (cure: 40' at 300° F.) | 59.5 | 54 | 60 | 54 |
| YMI (°C. at 10⁴ psi) (cure: 40' at 300° F.) | −38 | −30 | −30 | −38 |

As indicated by the data in Tables II and III, compositions of the invention in which the elastomer of high Tg is polybutadiene polymer or an SBR copolymer show a desirable combination of wet grip traction and rolling resistance.

EXAMPLES 10–13

These examples illustrate the effect of elastomer Tg and oil level on the wet and dry traction properties of tread rubber compounds. In these examples, styrene-butadiene copolymers (hereinafter referred to as SBR or SBR's for convenience) of varying Tg's were prepared substantially in accordance with the procedure of Example A except that the amounts of styrene used in the monomer blend were varied. Compound formulations were prepared by admixing the SBR's with low viscosity aromatic oil, carbon black, curing agents and other ingredients. As oil levels were increased carbon black levels were correspondingly increased in order to produce finished compounds having comparative strength and hardness properties. A compound containing no oil was prepared to serve as a control. Compound formulations were as follows:

| Ex. No. | Control | 10 | 11 | 12 | 13 |
|---|---|---|---|---|---|
| Ingredients | | | | | |
| SBR, % S* = 33, Tg = −48° C. | 100.00 | — | — | — | — |
| SBR, % S = 28, Tg = −54° C. | — | 100.00 | — | — | — |
| SBR, % S = 30, Tg = −50° C. | — | — | 100.00 | — | — |
| SBR, % S = 36, Tg = −44° C. | — | — | — | 100.00 | — |
| SBR, % S = 37, Tg = −44° C. | — | — | — | — | 100.00 |
| Aromatic oil (Vis = 140) | 0 | 10.00 | 25.00 | 10.00 | 35.00 |
| HAF black | 45.00 | 50.00 | 57.00 | 50.00 | 61.00 |
| Zinc Oxide | 3.00 | 3.00 | 3.00 | 3.00 | 3.00 |
| Stearic Acid | 2.00 | 2.00 | 2.00 | 2.00 | 2.00 |
| Wax | 3.00 | 3.00 | 3.00 | 3.00 | 3.00 |
| Sulfur | 1.40 | 1.50 | 1.75 | 1.50 | 1.80 |
| Accelerator #1** | 1.40 | 1.50 | 1.75 | 1.50 | 2.10 |
| Accelerator #2*** | .15 | .10 | .15 | .25 | .25 |
| | 155.95 | 171.10 | 193.65 | 171.25 | 208.15 |

*% S = percent styrene
**n-tertiary-butyl-2 benzothiazole sulfenamide
***2-mercaptobenzothiazole The above formulations were mixed and cured as in Examples 1–3. Wet and dry grip traction were determined by actual tire tests. Traction results are shown in Table IV. The traction results are reported in the Table as a traction rating with the control values given a rating of 100.

TABLE IV

| Ex. No. | Control | 10 | 11 | 12 | 13 |
|---|---|---|---|---|---|
| Traction Rating | | | | | |
| Wet | 100 | 96 | 98 | 102 | 103 |
| Dry | 100 | 102 | 106 | 103 | 111 |

As shown by the above data, wet traction increases with increased Tg of the SBR while dry traction increases with increased Tg and increased oil level.

I claim:

1. An elastomer composition adapted for use in forming the tread portion of tires having low rolling resistance and good wet and dry grip traction comprising:
    (a) An elastomer having a Tg of −60° C. or higher selected from the group consisting of a polymer of a conjugated diene and a copolymer of a a conjugated diene and a vinyl aromatic hydrocarbon; and
    (b) from about 10 to about 60 parts by weight per 100 parts by weight of said elastomer of an aromatic oil having an aromatic content of 60 percent or more and a viscosity at 100° F. of from about 50 to 2500 SUS.

2. The elastomer composition of claim 1 wherein said elastomer has a Tg of −55° C. or higher.

3. The elastomer composition of claim 1 wherein said polymer of a conjugated diene is polybutadiene.

4. The elastomer composition of claim 3 wherein said polybutadiene has a 1,2-microstructure content of 50 percent or greater.

5. The elastomer composition of claim 1 wherein said copolymer of a conjugated diene and a vinyl aromatic hydrocarbon is a copolymer of butadiene and styrene.

6. The elastomer composition of claim 5 wherein said copolymer contains from about 5 to about 50 percent by weight of styrene and a 1,2-microstructure content in the diene portion of the copolymer of less than 55 percent.

7. The elastomer composition of claim 6 wherein said copolymer has a styrene content of 25 to 40 percent and a 1,2-microstructure in the butadiene portion of the copolymer of less than 40 percent.

8. The elastomer composition of claim 1 wherein said aromatic oil has a viscosity at 100° F. of from about 50 to about 1500 SUS.

9. The elastomer composition of claim 1 wherein said aromatic oil has a viscosity at 100° F. of from about 50 to about 600 SUS.

10. The elastomer composition of claim 1 wherein said aromatic oil is present in an amount of from 15 to 50 parts by weight per 100 parts by weight of said elastomer.

11. The elastomer composition of claim 1 wherein said aromatic oil is present in an amount of from 20 to 40 parts by weight per 100 parts by weight of said elastomer.

12. The elastomer composition of claim 1 further containing special purpose additives selected from the group consisting of reinforcing fillers, non-reinforcing fillers, plasticizers, antioxidants and curing agents.

13. The elastomer composition of claim 1 wherein up to about 40 percent by weight of said elastomer having a Tg of −60° C. or higher is replaced with an elastomer having a Tg of below −60° C.

14. The elastomer composition of claim 13 wherein said elastomer having a Tg of below −60° C. or lower is selected from the group consisting of natural rubber, a polymer of conjugated diene and a copolymer of a conjugated diene and a vinyl aromatic hydrocarbon.

15. The elastomer composition of claim 1 wherein said elastomer is a copolymer of butadiene and styrene containing from 25 to 40 percent by weight of styrene and having a 1,2-microstructure in the butadiene portion of the copolymer of less than 40 percent and wherein said aromatic oil is present in an amount of from 20 to 40 parts by weight per 100 parts by weight of said elastomer.

16. The elastomer composition of claim 1 wherein said composition has a rebound resilience of from 53 to 70 percent.

* * * * *